(12) United States Patent
Jay et al.

(10) Patent No.: US 7,397,778 B2
(45) Date of Patent: Jul. 8, 2008

(54) METHOD AND APPARATUS FOR PREDICTING THE QUALITY OF PACKET DATA COMMUNICATIONS

(75) Inventors: Dylan Jay, Annandale (AU); Alexander M. Scholte, Chatswood (AU); Kim Mason, Payneham (AU); James D. Schreuder, Summer Hill (AU); Muneyb Minhazuddin, Quakers Hill (AU)

(73) Assignee: Avaya Technology Corp., Basking Ridge, NJ (US)

( * ) Notice: Subject to any disclaimer, the term of this patent is extended or adjusted under 35 U.S.C. 154(b) by 1044 days.

(21) Appl. No.: 10/420,567

(22) Filed: Apr. 21, 2003

(65) Prior Publication Data

US 2004/0208133 A1    Oct. 21, 2004

(51) Int. Cl.
  *H04L 12/66* (2006.01)
  *H04L 12/28* (2006.01)
  *G01R 31/08* (2006.01)

(52) U.S. Cl. .................. 370/332; 370/389; 370/252; 370/352

(58) Field of Classification Search ............ 348/14.08; 370/229, 230, 235, 252, 352, 389, 466, 241, 370/248, 395.21, 395.42, 412, 400, 356; 709/235; 379/88.17, 219, 220.01

See application file for complete search history.

(56) References Cited

U.S. PATENT DOCUMENTS

| | | | |
|---|---|---|---|
| 6,011,579 A * | 1/2000 | Newlin ..................... 348/14.08 |
| 6,269,099 B1 * | 7/2001 | Borella et al. ............... 370/389 |
| 6,657,957 B1 * | 12/2003 | Cheung et al. .............. 370/230 |
| 6,665,293 B2 * | 12/2003 | Thornton et al. ............ 370/352 |
| 6,700,875 B1 * | 3/2004 | Schroeder et al. ........... 370/252 |
| 6,731,625 B1 * | 5/2004 | Eastep et al. ................ 370/352 |
| 6,798,745 B1 * | 9/2004 | Feinberg ..................... 370/235 |
| 6,952,406 B2 * | 10/2005 | Procopio .................... 370/252 |
| 7,130,409 B2 * | 10/2006 | Beyda ......................... 379/229 |
| 7,167,451 B1 * | 1/2007 | Oran .......................... 370/252 |
| 7,194,076 B2 * | 3/2007 | Kotik et al. ............ 379/201.01 |
| 2002/0105909 A1 * | 8/2002 | Flanagan et al. ............ 370/230 |
| 2002/0114274 A1 * | 8/2002 | Sturges et al. .............. 370/229 |
| 2004/0015602 A1 * | 1/2004 | Goldhammer et al. ....... 709/235 |
| 2004/0032860 A1 * | 2/2004 | Mundra et al. .............. 370/352 |
| 2004/0131079 A1 * | 7/2004 | Hegde et al. ................ 370/466 |

\* cited by examiner

*Primary Examiner*—Hanh Nguyen
(74) *Attorney, Agent, or Firm*—Sheridan Ross P.C.

(57) ABSTRACT

The present invention provides a prediction of an available communication channel quality. According to the present invention, in response to a request for a communication channel, network devices are queried for network parameter status information. Based on the network status parameter information returned, a prediction as to the available quality levels available for the communication is made. An indication of the predicted quality of service for one or a number of requested service levels may be provided to the requesting user, who may then choose to defer initiation of the communication, or to proceed. A user may be notified when predicted quality levels available in connection with a requested communication reach a predetermined level, at which point the user may choose to establish the requested communication channel. Information regarding a rate associated with a requested quality of service level may also be provided.

25 Claims, 5 Drawing Sheets

US 7,397,778 B2

METHOD AND APPARATUS FOR PREDICTING THE QUALITY OF PACKET DATA COMMUNICATIONS

FIELD OF THE INVENTION

The present invention is directed to the prediction of packet data communication quality. In particular, the present invention is directed to predicting the quality of a packet data communication before a communication link is established.

BACKGROUND OF THE INVENTION

In a packet data network, the available bandwidth and latency may vary over time. For this reason, the quality of a voice telephony, video conference, or other real time communication may also vary over time. Because variations in communication quality can interfere with or prevent a successful communication, it would be desirable to provide an indication of the available communication quality before a communication session is established.

Internet protocol telephones that provide an indication of call quality while a call is in progress are available. In general, such a telephone analyzes the stream of network packets received as part of an ongoing communication, and displays to the user an indication of the existing call quality. However, such prior art devices only provide an indication of call quality while a call is in progress.

Systems that monitor network voice and video session quality are available. In particular, such systems monitor in-progress communications and provide information to network administrators that allows administrators to identify sources of network quality degradation. However, such systems are incapable of providing a predicted communication channel quality to a user prior to the initiation of a communication session.

In order to obtain a high quality communication link, quality of service (QoS) protocols have been developed. Where available, data packets marked with high quality of service levels may obtain preferential treatment from network resources. However, as can be appreciated, where available resources are insufficient, even communications using data packets marked for preferential treatment can be of poor quality. In addition, network providers may charge premium rates for delivering data packets marked to receive high quality of service levels. Therefore, quality of service protocols do not necessarily provide required communication quality, and the use of high quality of service of levels can result in increased communication costs.

SUMMARY OF THE INVENTION

The present invention is directed to solving these and other problems and disadvantages of the prior art. According to the present invention, a predicted communication channel quality is provided to a user before a communication session is established. Accordingly, the user may choose whether to proceed with a communication, or whether to defer initiation of the communication until a higher quality level is available from the network.

In accordance with an embodiment of the present invention, the prediction regarding communication channel quality is made in response to the receipt of network parameter status information. Network parameter status information may be obtained by querying one or more network devices for such information. In accordance with an embodiment of the present invention, network parameter status information may include the status of queues present in one or more routers along the communication path, a priority level for each call in progress at the time the query is made, the end to end delay for packets associated with a call already in progress, a packet loss rate associated with a call in progress, the observed packet jitter for a call in progress, and a total number of calls in progress. In general any QoS related parameter for a call in progress could be monitored.

In accordance with an embodiment of the present invention, each network device along a communication path is queried for network parameter status information. In accordance with another embodiment of the present invention, those devices along a known portion of the path are queried for network parameter status information, and a predicted quality level for the portions of a communication path serviced by the queried devices is returned to the user.

In accordance with still another embodiment of the present invention, a user may be notified when the predicted network quality for a communication meets or exceeds a threshold level. Such notification may be provided to a user using a call back function. In particular, in response to a prediction that the network quality will not be at least a specified threshold level, a user may enable a call back function. The network device or devices may then be periodically queried for network parameter status information. Once the returned network parameter status information is such that the predicted communication quality is greater than or equal to the threshold quality level, the user requesting the establishment of the communication channel may be called. The requested communication channel may then be established when the user answers the call.

In accordance with yet another embodiment of the present invention, information regarding available communication quality can be used to determine an appropriate quality of service level to associate with the data packets. For example, where traffic on a communication network is light, acceptable quality may be obtained using data packets that are marked for best effort delivery. When traffic levels are higher, a high priority quality of service level may be required in order to obtain a communication link having the desired quality. Accordingly, such an embodiment of the present invention allows more expensive quality of service levels to be selected only when doing so is required to obtain the desired communications link quality.

DETAILED DESCRIPTION

Figure 1:
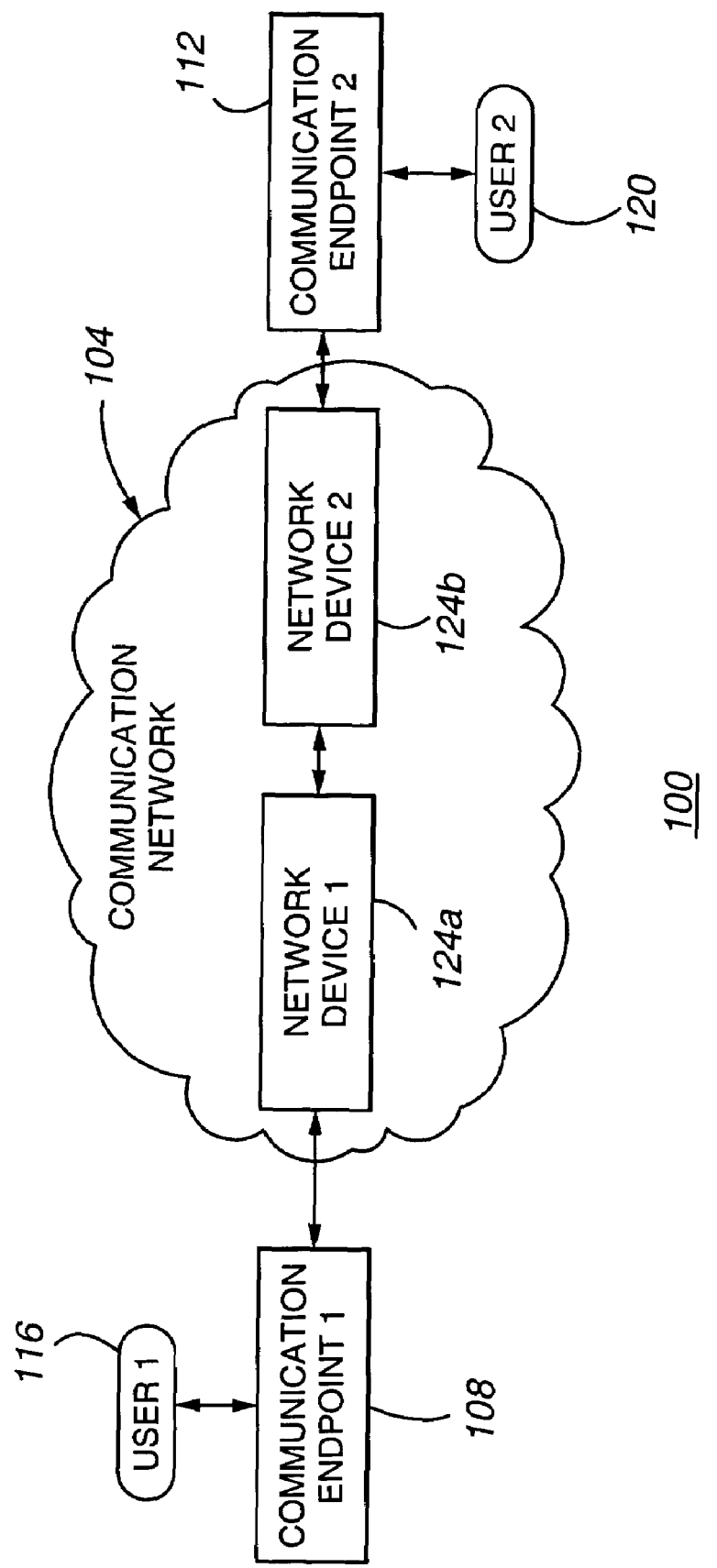
FIG. 1 is a block diagram depicting a system suitable for use in connection with a communication channel quality prediction system in accordance with an embodiment of the present invention.

With reference now to FIG. 1, a block diagram of a communication system 100 in accordance with an embodiment of the present invention is illustrated. In general, the communication system 100 includes a communication network 104, a first communication endpoint 108, and a second communication endpoint 112. A first user 116 may be associated with the first communication endpoint 108, while a second user 120 may be associated with the second communication endpoint 112. According to the present invention, the communication system 100 may include more than two communications endpoints 108, 112, and/or users 116, 120, for example in connection with a conference scenario.

The communication network 104 generally comprises a plurality of network devices. For example, as shown in FIG. 1, the communication network 104 may include a number of network devices 124. For instance, as illustrated in FIG. 1, the communication network 104 may include a first network device 124a and a second network device 124b. In accordance with an embodiment of the present invention, the network devices 124 may comprise packet data routers or switches, including private branch exchanges. Accordingly, it can be appreciated that the communication network 104 generally comprises a packet data network. An example of a communication network 104 in accordance with the present invention includes a local area network (LAN), a wide area network (WAN) or a combination of networks. In addition, the communication network 104 may include the Internet or a private intranet. As can appreciated by one of skill in the art, a very large number of network devices 124 may be used in establishing a communication link between a first communication endpoint 108 and a second communication endpoint 112.

In general, the first communication endpoint 108 may be selectively placed in communication with another communication endpoint, such as the second communication endpoint 112, across the communication network 104. As can be appreciated by one of skill in the art, the particular path over which a communication link between two communication endpoints 108, 112 is established over a communication network 104 may vary. This is especially true in connection with a packet data network. In addition, the quality available for the transmission of communications across a communication network 104 may be affected by the servicing of other communication links or tasks by various network devices 124 associated with the communication network 104. For example, where a network device 124 comprises an edge router, the total number of data packets, the number of data streams, and other tasks may affect the performance of the network device 124. The inventors have recognized that by querying one or more network devices 124, a prediction regarding the quality that can be expected in connection with a communication link can be made.

Figure 2:
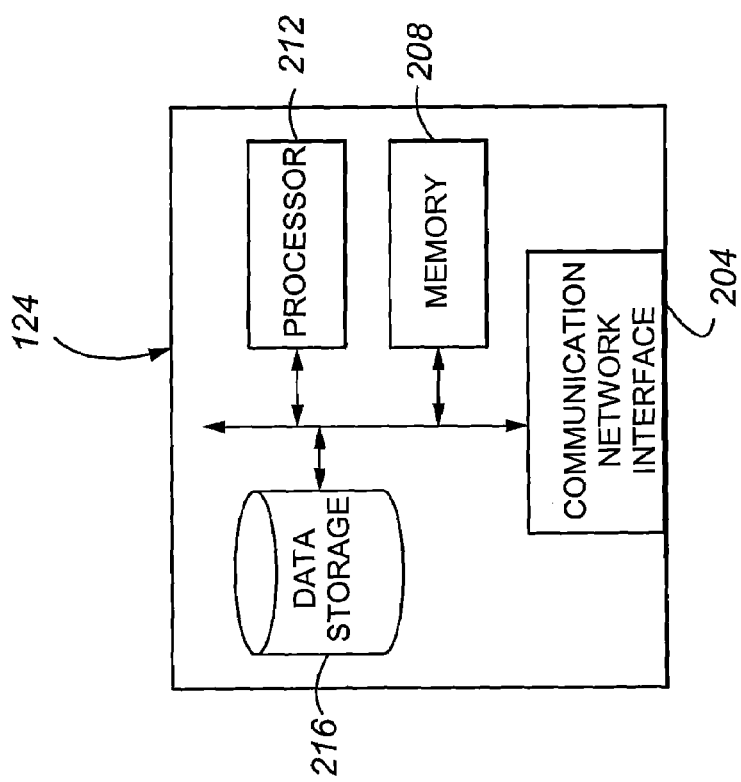
FIG. 2 is a block diagram of a network device in accordance with an embodiment of the present invention.

With reference now to FIG. 2, a block diagram of a network device 124 in accordance with an embodiment of the present invention is illustrated. In general, the network device 124 may include a communication network interface 204 for interconnecting the network device 124 to another network device and to a communication endpoint 108, 112. In addition, the network device 124 may include memory 208 for the storage of, for example, operating instructions and data, and a processor 212 for running operating instructions and for operating on or creating data. The network device 124 may additionally include a data storage 216 as an additional or alternative storage space for operating instructions and/or data.

The processor 212 may, in accordance with an embodiment of the present invention, perform instructions, for example stored in memory 208 and/or data storage 216, for performing the communication link quality check functions of the present invention, and/or receiving network parameter status information from other devices 124, and providing such information to a user 116, 120 through the quality indication output 324 of a communication endpoint 108, 112.

As can be appreciated by one of skill in the art, where a network device 124 comprises a packet data router, the device 124 generally receives data packets at the communication network interface 204. The router, implementing suitable operating instructions, then considers the destination address of a data packet, and routes the data packet to a next network device 124 or to the receiving communication endpoint 112. As may also be appreciated by one of skill in the art, the network device 124 may operate by referencing a table of other network devices 124, including communication endpoints 108, 112.

A network device 124 comprising a router may additionally utilize queues, for example established in memory 208, in which data packets are held prior to transmission to a next network device 124 or communication endpoint 108, 112. Data queues may be established in connection with different ports available on the network device 124 or in connection with the provision of different quality of service levels. Depending on how full the queues are, and thus how many other packets the network device 124 is handling, a prediction or estimate of the quality of a communication passing through the network device 124 can be made. For example, estimates of the end to end transmission time, packet jitter, and packet loss rates can be determined. Information regarding the actual quality delivered to other communication links established through a network device 124 may also be used to predict or estimate the quality that will be available to a requested communication link. Parameters of communications already in progress that may be used in connection with a predicted call quality include end to end transmission time, jitter, packet loss rate, packet transfer rate and available bandwidth.

Figure 3:
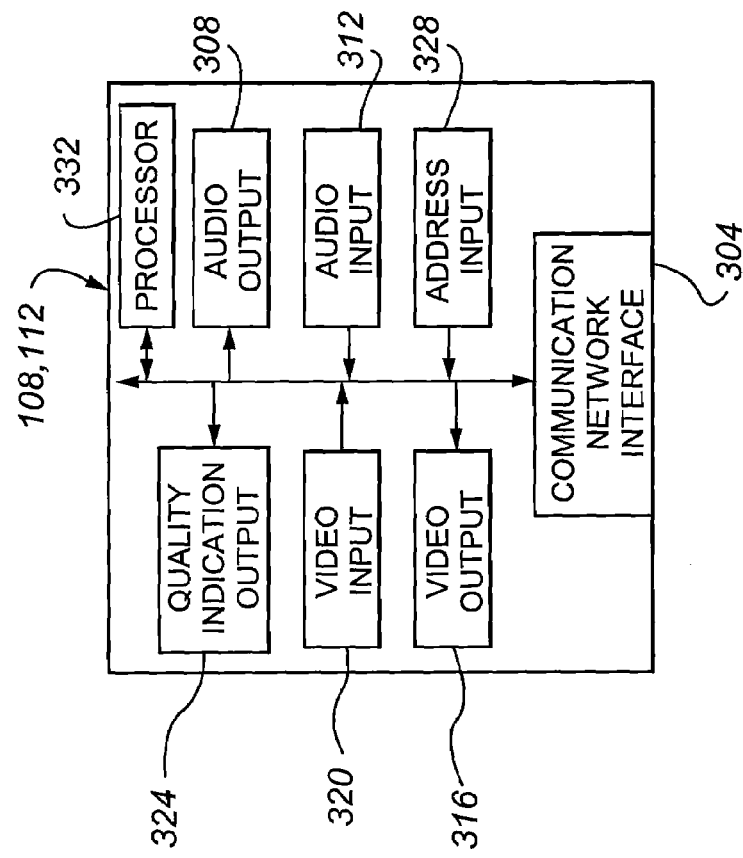
FIG. 3 is a block diagram of a communication endpoint in accordance with an embodiment of the present invention.

With reference now to FIG. 3, a block diagram of a communication endpoint 108, 112 in accordance with an embodiment of the present invention is illustrated. In general, the communication endpoints 108, 112 may be used in the transmission of audio (for example, in connection with voice telephony applications), audio and video (for example, in connection with teleconferencing applications) communications, or any other real-time communication. Accordingly, examples of communication endpoints 108, 112 include telephones, Internet protocol telephones, soft telephones, video conferencing telephones, and soft video conferencing telephones. In general, the communication endpoint 108, 112 includes a communication network interface 304 for interconnecting the communication endpoint 108, 112 to a network device 124, 128 of a communication network 104. In addition, the communication endpoint 108, 112 may include an audio output 308 for delivering audible information to a user, and an audio input 312 for receiving audible information from a user 116, 120. Additionally or alternatively, a communication endpoint 108, 112 may include a video output 316 for providing visual output to a user 116, 120, and a video input 320 for receiving visual information. In accordance with an embodiment of the present invention, a communication endpoint 108, 112 may also include a server device from which a stream of data, for example a video clip, is provided to a communication endpoint 108, 112 associated with a user 116 or 120. In addition, a communication endpoint 108, 112 in accordance with the present invention may include a quality indication output 324. The quality indication output 324 may be implemented as an audible, visual, or both audible and visual indicator. In accordance with another embodiment of the present invention, the quality indication output 324 may utilize the audio output 308 and/or the video output 316 for providing a quality indication to a user 116, 120. Accordingly, a quality indication output may include a bar indicator, a dial, or an indicator lamp.

The communication endpoint 108, 112 may additionally include an address input 328. The address input may comprise a keyboard and/or pointing device to allow a user 116, 120 to enter information regarding a destination communication endpoint 108, 112. For example, the address input 328 may be used to receive a telephone number from a user 116, 120. Alternatively, the address input 328 may be used to input an Internet protocol or session initiation protocol address.

A communication endpoint 108, 112 according to an embodiment of the present invention may also include a processor 332 and/or memory 336. The processor 332 may perform instructions, for example embodied in software stored in the memory 336 for performing the communication link quality check functions of the present invention, and/or receiving network parameter status information and providing such information to a user 116, 120 through the quality indicator output 324. The processor 332 may also function in connection with the packetization or depacketization of data.

Figure 4:
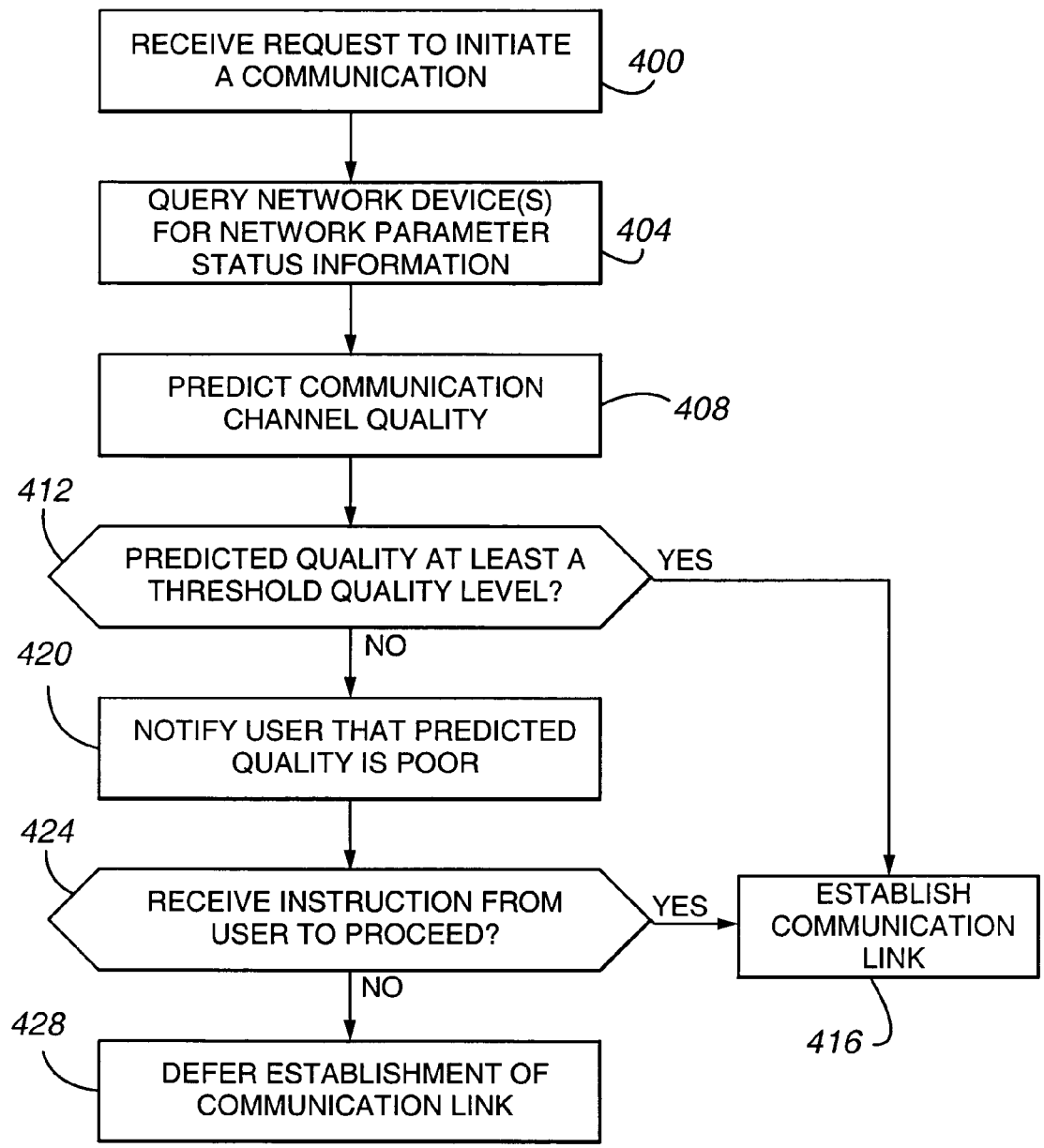
FIG. 4 is a flow chart depicting a method for predicting the quality of a communication channel in accordance with an embodiment of the present invention.

With reference now to FIG. 4, the operation of a communication quality prediction system in accordance with an embodiment of the present invention is illustrated. Initially, at step 400, a request to initiate a communication is received. For example, the request to initiate a communication may include the receipt of a telephone number or other address entered by a user 116 at the address input 328 of a first communication endpoint 108. In response to the request to initiate a communication, a network device or devices 124 along a path of the requested communication are queried for network parameter status or device information (step 404). In accordance with an embodiment of the present invention, each network device 124 along a path of a requested communication is queried for network parameter status information. In accordance with another embodiment of the present invention, less than all of the network devices 124 along a path of a requested communication are queried for network parameter status information. Less than all of the network devices 124 may be queried where, for example, the communication endpoint 108 or network device 124 initiating the query has access to less than all of the network parameter status information of other network devices 124. In accordance with still another embodiment of the present invention, only network devices 124 comprising edge routers at the interface between a subnetwork including the first or sending communication endpoint 108 and the communication network 104, and the second or receiving communication endpoint 112 and the communication network 104 are queried for network parameter status information.

The network parameter status information returned in response to the query may comprise device load information for each network device that is queried. For example the network parameter status information may include the number of packets presently queued within a network device 124, the number of packets in a queue or queues within a network device 124 of a specified quality of service level, the end to end delay, packet loss and jitter observed in connection with communications in progress over some or all of the subnetworks within a communication network 104 that will be used for the requested communication, or other indications of traffic levels or congestion in connection with a communication network 104 and the associated network devices 124. For example, the network parameter status information may include the number of voice streams currently traversing an IP trunk. The network parameter status information may be obtained using management information bases (MIBs) for network devices 124 comprising DiffServ enabled routers, or using similar information made available by other quality of service (QoS) systems.

Upon receipt of the network parameter status information, a prediction regarding the communication channel quality available for the requested communication may be made (step 408). The prediction generally comprises an estimate of the available quality based on the returned network status parameters. Accordingly, the estimate may be based on one or more different network status parameters returned from one or more network devices 124. Furthermore, a different prediction may be made for each segment or leg of the communication channel. For example, in connection with a requested communication comprising an international telephonic voice communication, a different quality prediction may be made for the portion of the communication that will be carried across a local trunk line, for the segment that will be carried across an international trunk line, and for the portion carried across a network segment proximate to the receiving communication endpoint. Furthermore, a single predicted quality level comprising a composite of the predictions made for individual segments may be provided. In addition, if network parameter status information for one or more segments is unavailable, a prediction of the available communication channel quality may be made for or based on only those segments for which information is available.

At step 412, a determination is made as to whether the predicted communication channel quality is of at least a threshold quality level. If the selected threshold quality level is met, the requested communication link may be established (step 416). If the predicted quality level does not meet the predetermined threshold quality level, the user (e.g., user 116) may be notified that the predicted quality is poor (step 420). At step 424, a determination is made as to whether the user 116 has instructed the system to proceed with the requested communication. If such an instruction has been received, the requested communication link may be established (step 416). If such an instruction is not received, the establishment of the requested communication link may be deferred (step 428). For example, the user 116 may make another request to initiate the communication at a later time.

Figure 5:
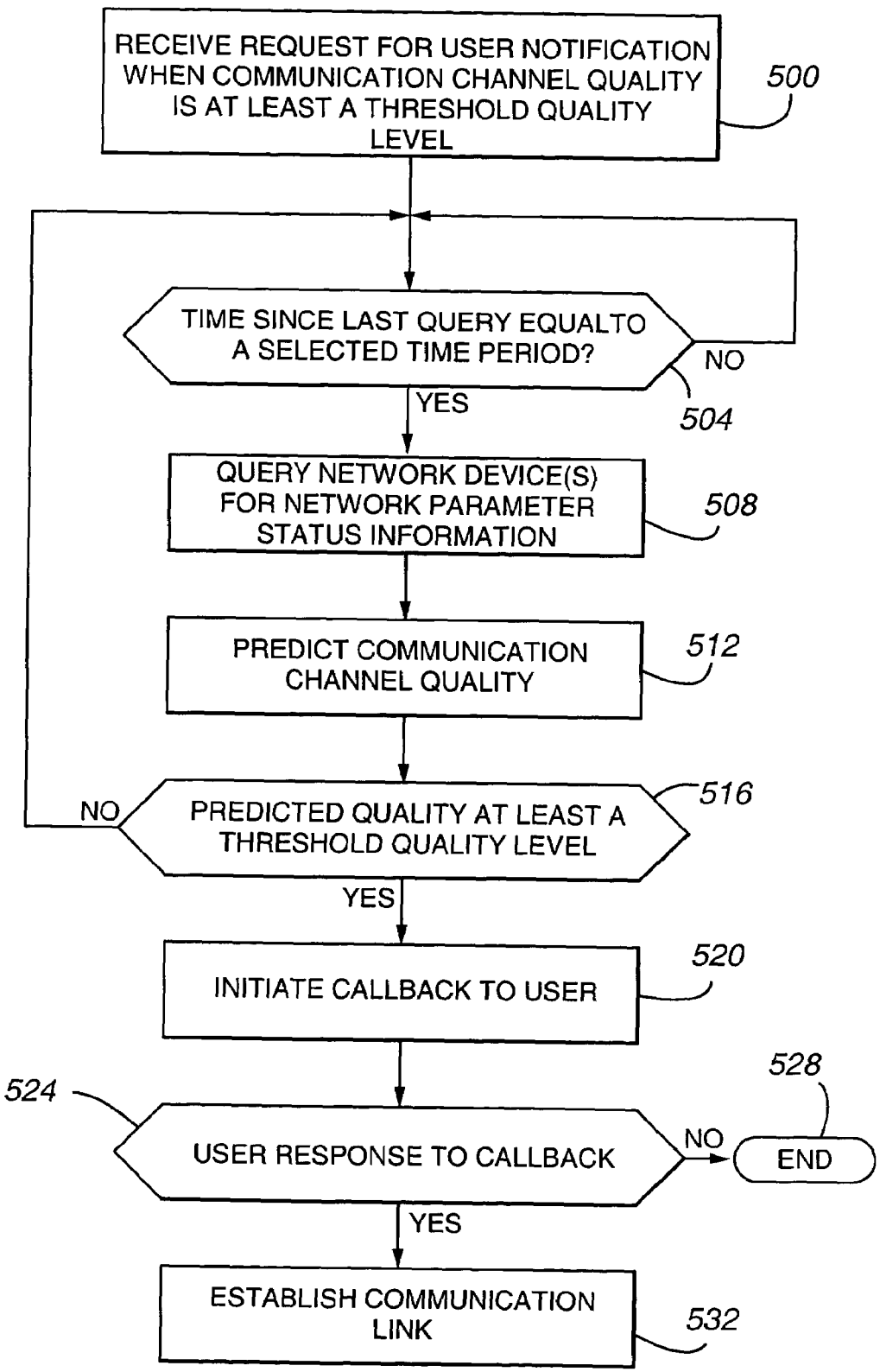
FIG. 5 is a flow chart depicting a method for notifying a user that the predicted quality of a communication channel is acceptable in accordance with an embodiment of the present invention.

In accordance with another embodiment of the present invention, automatic notification to the user of predicted communication channel quality levels meeting a specified threshold value can be made. In particular, and with reference now to FIG. 5, the user 116 may request notification when the predicted communication channel quality is at least a threshold quality level (step 500). A determination may then be made as to the time elapsed since the last query of network devices 124 regarding network status parameters was made (step 504). If the time elapsed since the last query is not equal to or greater than a selected time period, the system idles at step 504. If the time elapsed since the last query was made is equal to or greater than the selected time period, a network device or devices 124 are queried for network parameter status information (step 508). From the information returned in response to the query, the communication channel quality is predicted (step 512).

At step 516, a determination is made as to whether the predicted quality is of at least a threshold quality level. If the predicted quality is not of at least a threshold quality level, the system returns to step 504. If the threshold quality level is met, call back to the user 116 is initiated (step 520). In general, the call back to the user 116 may comprise a selected signal. For example, in accordance with an embodiment of the present invention, the notification may be in the form of a ring delivered to the communication endpoint 108 proximate to the user 116 that initiated the request for a communication link. At step 524, a determination is made as to whether the user has responded to the call back signal. If the user 116 has not responded, the procedure may end (step 528). If the user 116 responds to the call back, for example, by lifting a receiver associated with the communication endpoint 108 or otherwise signaling an acknowledgment of its signal, the requested communication link may be established (step 532).

Figure 6:
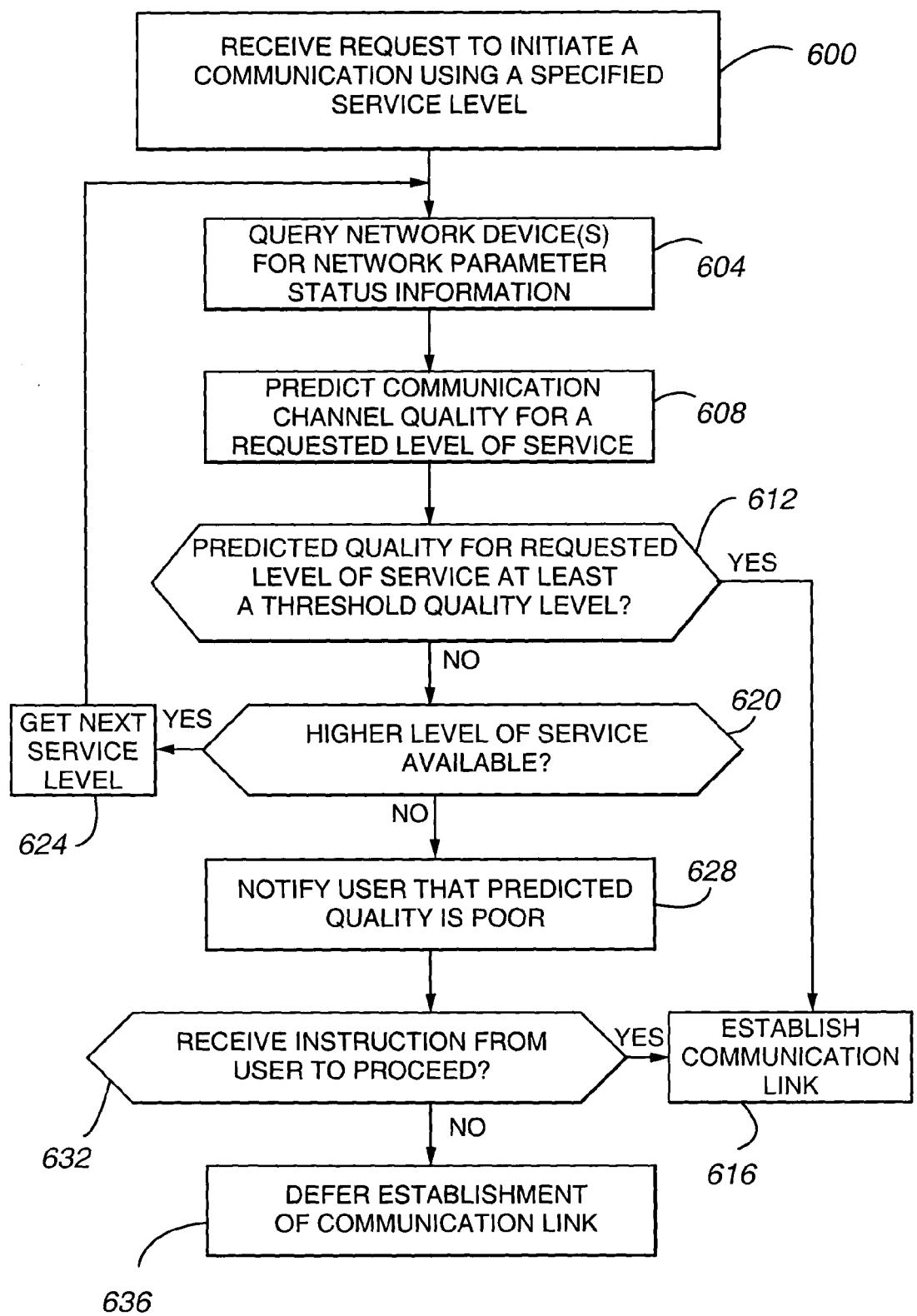
FIG. 6 is a flow chart depicting a method for selecting a desired communication channel quality in accordance with an embodiment of the present invention.

With reference now to FIG. 6, the operation of a system allowing a desired level of communication channel quality to be selected in accordance with an embodiment of the present invention is illustrated. Initially, at step 600, a request to initiate a communication using a specified service level is received. For example, a user 116 seeking to initiate a communication but who is sensitive to the costs associated with doing so may specify a best efforts or other lost cost quality of service level. In response to the request to initiate a communication, a network device or devices 124 along a path of the requested communication are queried for network parameter status information (step 604). In particular, the network device or devices 124 may be queried for network parameter status information in connection with communications made using data packets marked with the requested quality of service level. For example, only those queues established on a network device or devices 124 for use in connection with the specified quality of service level may be queried. Alternatively, network parameter status information in connection with all queues on the network device or devices 124 may be obtained.

The network parameter status information returned in response to the query is then used to predict the communication channel quality that will be delivered at the requested quality of service level (step 608). Like the embodiment described for example in connection with FIG. 4, the network parameter status information may be obtained from all or a subset of the network devices 124 along a communication path. Furthermore, the prediction of communication channel quality may be based on management information base data for the network device or devices 124, such as MIB information available from DiffServ enabled routers.

At step 612, a determination is made as to whether the predicted communication channel quality is of at least a threshold quality level. If the selected threshold quality level is met, the requested communication link may be established (step 616). If the predicted quality level does not meet the predetermined threshold quality, a determination may be made as to whether a higher level of service is available (step 620). If a higher level of service is available, the next quality of service level is obtained (step 624) and system then returns to step 604 to query the network device or devices 124 for network parameter status information in connection with the new specified service level. Alternatively, where network parameter status information has been obtained previously that can be used for the new specified service level, the system may predict the communication channel quality for the specified level of service (step 608) and proceed to step 612.

If a higher level of service is not available, the user may be notified that the predicted quality is poor (step 628). The user may then choose to continue with the desired communication, or wait until such time as a higher service level is available. Accordingly, at step 632, a determination is made as to whether an instruction has been received from the user 116 to proceed. If such an instruction has been received, the requested communication link is established (step 616). If such an instruction is not received, the establishment of the communication link may be deferred (step 636). If the establishment of the requested communication link is deferred, the available communication channel quality may be monitored and the user notified, for example as illustrated in connection with FIG. 5. Alternatively, establishment of the requested communication link may be deferred indefinitely.

In connection with an embodiment allowing a user to choose different quality of service levels, such as shown in FIG. 6, a user may be allowed to intervene to prevent establishment of a communication link if doing so would require the use of a high requested quality of service level. Furthermore, the quality of service level that is available for communication may be determined based on the type of communication that has been requested. For example, a user 116 seeking to initiate a personal communication from a workplace communication endpoint 108 may be restricted from using the highest quality of service level or levels. Alternatively, where the communication is in connection with a call to a client, even the highest quality of service levels may be available.

In accordance with an additional embodiment of the present invention, the user may be provided with rate information applicable to different requested quality of service levels. In accordance with such an embodiment, the user may determine whether a communication link should be established with reference to the rate that will charged in order to obtain a desired quality of service level.

As can be appreciated from the description set forth herein, the present invention is applicable to any time sensitive transmission of data. The present invention is particularly useful in connection with voice and video conferencing telephony applications performed in connection with packet data networks using a real-time transfer protocol.

Furthermore, it should be appreciated that the prediction of available communication channel quality may be performed in a network device, including a network device 124 comprising a router, or a private branch exchange, or by a communication endpoint 108, 112. In general, the steps of querying network devices, predicting available communication channel quality levels, and notifying a user when predicted quality levels are acceptable after a deferred attempt to establish such a channel may be performed in connection with any device having access to information concerning network devices 124 associated with the communication network 104. Furthermore, the various functions may be distributed among a number of such devices.

In accordance with still another embodiment of the present invention, the predicted quality data for each of a number of available communication links or routes may be used to allow the user, either through an automated process or manually, to select the highest quality route to the desired destination communication endpoint 112. For example, where there are several Internet protocol trunks through which a destination communication endpoint 112 may be reached, the trunk with the highest predicted quality can be identified and selected.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for predicting communication channel quality, comprising:
   receiving a first address segment;
   in response to receiving said first address segment, querying at least a first network device;
   receiving a second address segment;
   in response to receiving said second address segment, querying at least a second network device;
   in response to said queries of said first and second network devices, receiving network parameter status;
   predicting a communication channel quality using said network parameter status information;
   in response to an acceptable communication quality prediction, initiating a communication over said communication channel; and
   in response to an unacceptable communication quality prediction, waiting to initiate a communication over said communication channel.

2. The method of claim 1, wherein said at least a first network device comprises at least one of a router and a network switch.

3. The method of claim 1, wherein said at least a first network device comprises an edge router.

4. The method of claim 1, wherein said network device comprises a router, and wherein each router along a communication channel is queried.

5. The method of claim 1, wherein said step of querying a network device comprises querying a DiffServ management information base.

6. The method of claim 1, wherein said network parameter status information comprises at least one of a queue status, a priority level for each call in progress, end to end delay for packets associated with a call in progress, a packet loss rate for a call in progress, observed packet jitter for a call in progress, and a number of calls in progress.

7. The method of claim 1, further comprising:
   communicating said predicted communication channel quality to a user by at least one of a visual display and an audible output.

8. The method of claim 1, further comprising:
   second querying of a network device;
   second predicting a communication channel quality; and
   in response to said second predicting indicating an acceptable communication channel quality, initiating a communication to a communication device over a route in connection with which said communication channel quality was checked.

9. The method of claim 1, further comprising:
   after waiting a first time period following an unacceptable communication quality prediction, further querying of the first network choice, receiving further network parameter status information, and predicting a communication channel quality using said further network parameter status information.

10. The method of claim 9, further comprising:
    in response to an acceptable communication quality prediction using said further network parameter status information, initiating a call back to a user.

11. A communication quality prediction device, comprising:
    a communication network interface operable to send and receive packet data, wherein said communication quality prediction device is in communication with first and second network devices;
    memory operable to store operating code;
    a processor operable to run said operating code, wherein said first network device is queried for network parameter status information after a first address segment is received and prior to initiation of a communication, wherein said second network device is queried for network parameter status information after a second address segment is received and prior to initiation of the communication, and wherein a prediction regarding an expected communication quality is made; and
    a communication quality indication output, wherein a user is provided with an indication of said prediction regarding an expected communication quality, wherein in response to an acceptable communication quality prediction a communication over the network is initiated, and wherein in response to an unacceptable communication quality prediction a communication over the network is deferred.

12. The device of claim 11, wherein said communication quality indication output comprises at least one of a visual display and an audible output.

13. The device of claim 11, wherein said communication comprises a voice over Internet protocol call.

14. The device of claim 11, wherein said first network device comprises a router.

15. A method, comprising:
    receiving a request to initiate a communication over a communication channel;
    querying a network device regarding at least first network parameter status information; and
    in response to receiving said at least a first network parameter status information, predicting a present quality of said communication channel;
    signaling said predicted present quality of said communication quality to a user making said request to initiate a communication, wherein said request to initiate a communication comprises receiving from said user at least a first address segment, and wherein said at least a first network parameter status information is related to a portion of said communication channel indicated by said at least a first address segment, and wherein at least a second address segment is required in combination with the first address segment to complete the communication.

16. The method of claim 15, further comprising:
    receiving an instruction from said user to proceed with establishing said communication.

17. The method of claim 15, wherein said network device comprises a router and wherein said at least a first network status parameter comprises a queue status of said router.

18. The method of claim 15, wherein said network device comprises a switch and wherein said at least a first network status parameter comprises a number of other communications being handled by said switch.

19. The method of claim 15, wherein said call comprises at least one of a voice telephony communication and a video conference communication.

20. The method of claim 15, wherein said computational component comprises a computer readable storage medium containing instructions for performing the method.

21. The method of claim 15, wherein said computational component comprises a logic circuit.

22. The method of claim 15, further comprising:

in response to an unacceptable communication quality prediction for the portion of said communication channel indicated by said first address segment, deferring a communication over said communication channel, wherein said communication channel quality prediction is made for said first address segment only.

23. A system for predicting communication channel quality, comprising:

means for querying at least a first network device for network parameter status information;

means for predicting communication channel quality using said network parameter status information in response to receipt of a first address segment, and for querying at least a second network device for network parameter status information in response to receipt of a second address segment; and means for communicating said predicted communication channel quality to a user, wherein in response to a predicted unacceptable communication channel quality, a communication using the communication channel is deferred.

24. The system of claim 23, wherein said means for communicating comprises a call back function, wherein a requested communication link is established in response to a predicted communication channel quality that meets at least a threshold level.

25. The system of claim 23, wherein said network parameter status information comprises at least one of a queue status, a priority level for an existing communication link, an end to end delay for an existing communication link, a packet loss rate for an existing communication link, and a number of existing communication links.

* * * * *